March 15, 1960 L. T. ASKREN 2,928,265
FRICTION CLUTCH
Filed May 5, 1958 2 Sheets-Sheet 1
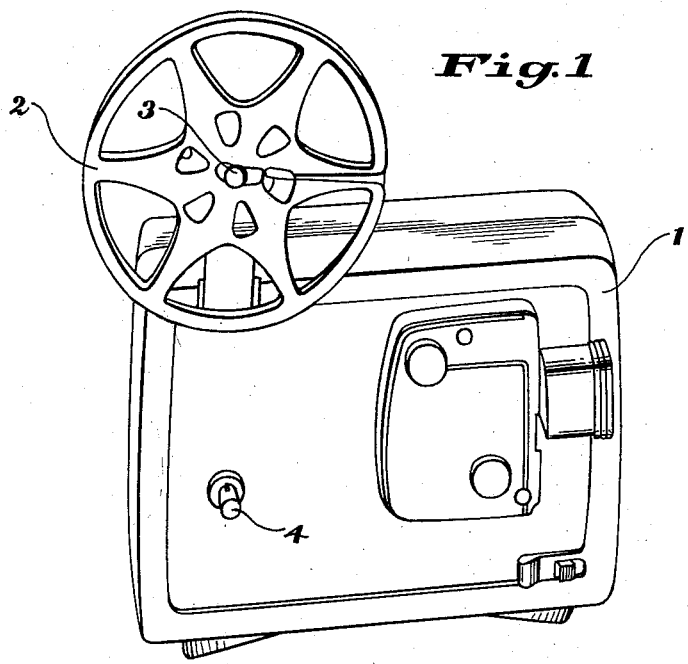
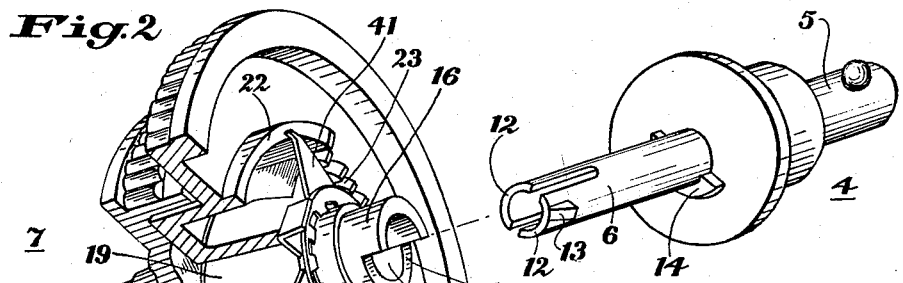
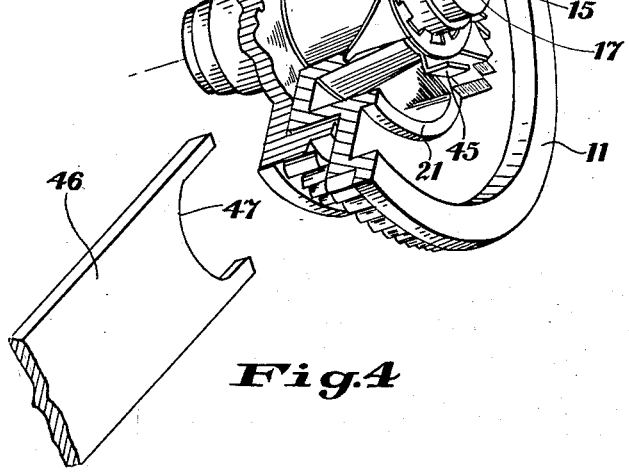
Lee T. Askren
INVENTOR.

March 15, 1960  L. T. ASKREN  2,928,265
FRICTION CLUTCH
Filed May 5, 1958  2 Sheets-Sheet 2
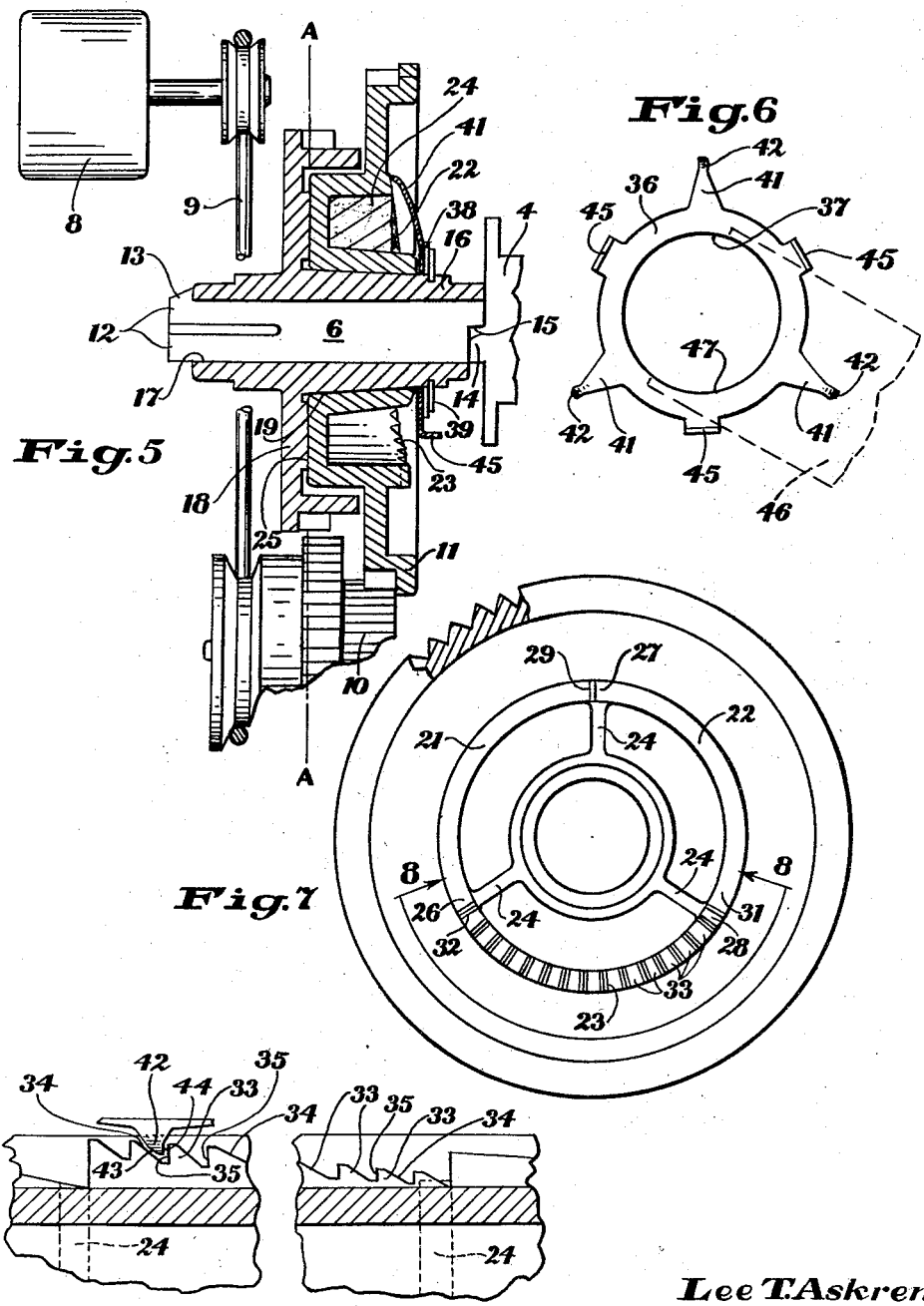
Lee T. Askren
INVENTOR.

United States Patent Office
2,928,265
Patented Mar. 15, 1960

2,928,265
FRICTION CLUTCH

Lee T. Askren, Rochester, N.Y., assignor to Eastman Kodak Company, Rochester, N.Y., a corporation of New Jersey Application May 5, 1958, Serial No. 732,986

3 Claims. (Cl. 64—30)

This invention relates generally to clutches and more specifically to an adjustable friction clutch interposed between the drive motor and film take-up shaft of a movie projector.

In the conventional movie projector, the film during projection is drawn from a supply reel and wound onto a take-up reel which is driven by a drive motor. A friction clutch is normally interposed between the drive motor and the take-up reel to mechanically couple the take-up reel to the drive motor and to provide slippage therebetween to accommodate for the slowing up of the take-up reel as the film rolled thereon increases in diameter.

One of the primary objects of the present invention is to provide an improved adjustable friction clutch for a movie projector that is of simple design and construction, thoroughly reliable and efficient in operation, and economical to manufacture.

Another object of the invention is the provision of an improved adjustable friction clutch having simple means for selectively adjusting the torque transmitted thereby over a wide range.

Objects and advantages other than those set forth above will be apparent from the following description when read in connection with the accompanying drawings, in which:

Fig. 1 is a perspective view of a movie projector in which the invention is embodied;

Fig. 2 is a perspective view of the friction clutch of this invention with a portion thereof broken away and sectioned;

Fig. 3 is a perspective view of a take-up shaft upon which the clutch is mounted;

Fig. 4 is a perspective view of a tool adapted to cooperate with the clutch for selectively adjusting the torque thereof;

Fig. 5 is a side elevation view in section of the friction clutch of this invention and showing a drive mechanism for driving same;

Fig. 6 is a plan view of a spring member incorporated in the friction clutch of this invention;

Fig. 7 is a side elevation view with a portion thereof broken away of one of the friction clutch members shown in Fig. 5; and Fig. 8 is an enlarged fragmentary view partially in section taken along line 8—8 of Fig. 7 and showing a spring finger partially retracted from the teeth in order to more clearly indicate the shape of its end portion.

As shown in the drawings, a preferred embodiment of this invention is illustrated as applied to a movie projector 1. The projector 1 has a supply reel 2 mounted on a shaft 3, and a takeup shaft 4 spaced therefrom. One end 5 of the take-up shaft 4 as best seen in Fig. 3 is adapted to support a take-up reel, not shown, and the opposite end 6 is adapted to support a friction clutch 7. The shaft 4 is driven by a drive motor 8 which is connected thereto by a belt 9 and drive gear 10 which meshes with a gear member 11 of the clutch 7 as seen in Fig. 5. The end 6 of the shaft 4 is slotted to provide a pair of oppositely disposed resilient fingers 12, at least one of which is provided with an inclined lug 13. The shaft 4 is further provided with an arcuate segment 14 adapted to engage a corresponding notch 15 formed by one end of a clutch hub member 16 to drivingly connect the hub member 16 to the shaft 4. When the clutch 7 is mounted on the shaft 4, the fingers 12 are initially depressed radially inwardly allowing the lug to pass through the central bore 17 of the hub member 16. The clutch 7 is properly mounted on the shaft 4 when the segment 14 is seated in the notch 15. In this position, the lug 13 is clear of the clutch hub 16 allowing the fingers 12 to expand positioning the lug 13 in the path of the hub 16 for releasably holding the clutch 7 on the shaft as seen in Fig. 5.

The hub member 16 of the friction clutch 7 has a cylindrical friction disk 18 integrally formed therewith. The hub member 16 further has a conically tapered portion 19 upon which the gear member 11 is rotatably mounted, although the portion 19 need not be conical but may be cylindrical, if desired. The gear member 11 is provided on one side with three 120° arcuate ramp sectors 21, 22 and 23 radially spaced a fixed distance from the axis of the hub member 16 as best seen in Fig. 2 and Fig. 7. Ribs 24 are provided interconnecting the hub 16 of the gear member 11 and the ramp sectors 21, 22 and 23 to strengthen the gear member 11. The opposite side or face 25 of the gear member 11 is adapted to frictionally engage the frtiction disk 18. The ends 26, 27 and 28 of the respective ramp sectors 21, 22 and 23 are axially spaced a fixed distance from an established plane A—A which includes the face 25 of the gear member 11 as seen in Fig. 5. The opposite ends 29, 31 and 32 of the respective ramp sectors 21, 22 and 23 are axially spaced a greater fixed distance from the plane A—A than the ends 26, 27 and 28. Two of the ramp sectors 21, 22 preferably have a planar inclined surface interconnecting the ends of each sector, while the remaining ramp sector 23 is provided with a plurality of ascending teeth 33, each having an inclined leading portion 34 with respect to the plane A—A and a trailing edge 35 perpendicular thereto. A spring element 36 having a central opening 37 is rotatably mounted on the hub member 16, and is retained on the hub 16 by means of a washer 38 and locking ring 39 of any suitable type as seen in Fig. 5. The spring element 36 as best shown in Fig. 6 has three identical radially extending resilient arms 41 angularly spaced 120° apart and having end portions 42 adapted to cooperate with the ramp sectors 21, 22 and 23 to apply a force thereto. The arms 41 are bent inwardly and when installed on the hub 16 are flexed outwardly pretensioning the arms which in all positions of the clutch apply force to the sectors 21, 22 and 23. Each of the end portions 42 is bent and has an inclined leading edge 43 substantially parallel to the leading edge 34 of the teeth 33 to facilitate movement of the end portion 42 over the teeth in one direction, and a trailing edge 44 substantially parallel to the trailing edge 35 of one of the teeth 33 as shown in Fig. 8 to provide a stop means to prevent movement of the end portion 42 in the opposite direction. The spring element 36 is further provided with three lugs 45 angularly spaced 120° apart to provide a means by which the spring element 36 may be angularly turned with respect to the hub 16 and gear member 11 causing the end portions 42 of the arms 41 to ride up the ramp sectors 21, 22 and 23 increasing the outward flexing of the arms 41 and the force applied to the sectors. This is accomplished by a tool 46 such as shown in Fig. 4 which is inserted between two of the lugs 45 with the U-shaped cut-out portion 47 receiving the hub member 16 as seen dotted in Fig. 6. In this position, the sides of the tool 46 bear against the lugs 45.

In the operation of this invention, let us assume initially that the spring element 36 is disposed with each of the end portions 42 seated on one of the ends 26, 27 and 28 of a complementary ramp sector 21, 22 and 23. In this position, the resilient arms 41 are flexed the least amount and the friction clutch 7 accordingly transmits the least amount of torque. Now if it is desired to increase the torque transmitted by the clutch 7, the tool 46 is inserted between two of the lugs 45 and force applied thereto to turn the spring member 36 in a clockwise direction as seen in Fig. 2. As the spring member 36 is angularly turned, the end portions 42 of two of the arms 41 slide along the ramps 21, 22 upon which they bear, and the remaining arm 41 and end portion 42 is cammed axially outwardly by virtue of the cooperating inclined edges 34, 43 on each tooth 33 and end portion 42 respectively causing the end portion 42 to successively climb over the teeth 33 as the end portion 42 is advanced. Assuming that the spring member 36 is angularly turned only a sufficient distance to cause the end portion 42 to climb over a single tooth, each of the end portions 42 of the spring 36 in this position will have been moved axially outwardly a slight distance from the plane A—A thereby causing a slight increase in the force exerted by the spring arms 41 urging the gear member 11 into frictional engagement with the friction disk 18. The spring element 36 is prevented from being turned in a counterclockwise direction to reduce the clutch torque by virtue of the trailing edge 44 of the end portion 42 engaging the trailing edge 35 of the tooth 33. The clutch torque may be selectively increased in small increments in the manner illustrated a number of times corresponding to the number of teeth 33 in the tooth sector 23 to a maximum torque which occurs when the end portion 42 is seated in the groove between the last two teeth 33 in the tooth sector 23. Further rotation of the spring element 36 causes the end portions 42 to ride off the ends 29, 31 and 32 of the respective sectors 21, 22 and 23 and into the initial position where the clutch 7 develops the least amount of torque; that is, with each of the end portions 42 seated on one of the ends 26, 27 and 28 of a complementary ramp sector 21, 22 and 23.

Although but one embodiment has been illustrated and described, it will be apparent to those skilled in the art that various changes and modifications may be made therein without departing from the spirit of the invention or from the scope of the appended claims.

I claim:

1. In a friction clutch for connecting a drive means to a reel-carrying shaft of a movie projector, the combination of: a first clutch member having a hub drivingly connected to said shaft, and a friction disk integrally formed with said hub; a second clutch member rotatably mounted on said hub and driven by said drive means, said second clutch member having a face on one side in engagement with said friction disk and a plurality of arcuate ramp sectors on the opposite side, one of the ends of each of said sectors being axially spaced a fixed distance from a plane including said face, the opposite ends of each of said sectors being axially spaced a greater fixed distance from said plane than said other ends, one of said sectors further having a plurality of teeth, each of said teeth having a leading edge inclined to said plane and a trailing edge perpendicular thereto; a spring member rotatably mounted on said hub, and having a plurality of resilient fingers complementary to said sectors, each of said fingers having an end portion adapted to slidably bear upon one of said ramp sectors for urging said face of said second clutch member into frictional engagement with said friction disk of said first clutch member; means for retaining said spring member on said hub; and means for turning said spring member in one direction from one position in which one of said end portions of said fingers bears against said trailing edge of one of said teeth causing said end portion to move along the leading edge of the succeeding tooth and to drop behind the trailing edge of said tooth preventing said spring member from being moved in the opposite direction, said end portions in this new position being axially spaced a greater distance from said plane than in said one position causing said fingers to exert a greater axial force on said second clutch member thereby increasing the torque transmitted by said friction clutch.

2. The invention as defined in claim 1 wherein said hub is mounted on said shaft and said last mentioned means comprises a plurality of upturned lugs formed by said spring member intermediate said fingers, whereby a tool may be inserted between two of said lugs for turning said spring member.

3. The invention as defined in claim 1 wherein each of said end portions has a leading edge substantially parallel to said leading edge of one of said teeth to facilitate movement of said end portion over said tooth in one direction, and a trailing edge substantially parallel to said trailing edge of one of said teeth to provide a stop means to prevent movement of said end portion in the opposite direction.

References Cited in the file of this patent

UNITED STATES PATENTS

| | | |
|---|---|---|
| 788,810 | Ambler | May 2, 1905 |
| 1,575,637 | Neth | Mar. 9, 1926 |
| 2,476,437 | Whisman | July 9, 1949 |
| 2,498,626 | Bivans | Feb. 21, 1950 |
| 2,651,530 | Blydenburgh | Sept. 8, 1953 |